F. A. GOUGH.
DENTAL TOOTH REGULATING APPLIANCE.
APPLICATION FILED APR. 29, 1911.
1,013,993.
Patented Jan. 9, 1912.
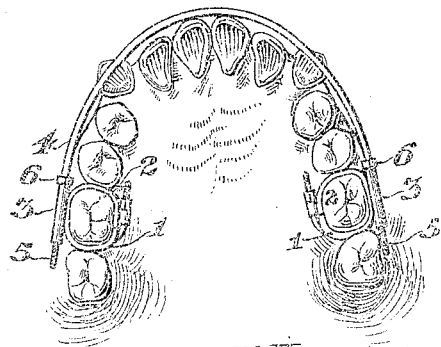
FIG. I.
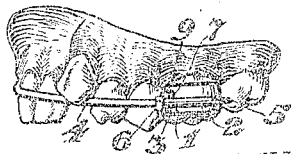
FIG. II.
 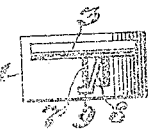 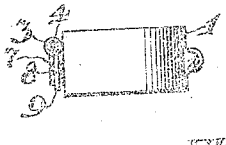 
FIG. III.  FIG. IV.  FIG. V.  FIG. VI.
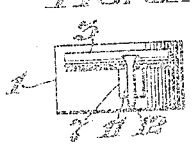 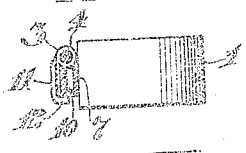 
FIG. VII.  FIG. VIII.  FIG. IX.
 
FIG. X.  FIG. XI.  FIG. XII.
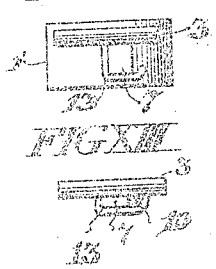   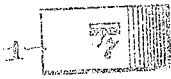
FIG. XIII.  FIG. XIV.  FIG. XV.
Inventor:
Frank A. Gough
by Edward F. Simpson Jr.
Attorney
Witnesses

UNITED STATES PATENT OFFICE.

FRANK A. GOUGH, OF BROOKLYN, NEW YORK.

DENTAL TOOTH-REGULATING APPLIANCE.

1,013,993.　　　　　Specification of Letters Patent.　　Patented Jan. 9, 1912.

Application filed April 29, 1911. Serial No. 624,116.

*To all whom it may concern:*

Be it known that I, FRANK A. GOUGH, a citizen of the United States, residing at Brooklyn, in the county of Kings, in the State of New York, have invented a certain new and useful Improvement in Dental Tooth-Regulating Appliances; and I do hereby declare the following to be a full, clear, and exact description of the invention, such as will enable others skilled in the art to which it appertains to make and use the same.

My invention relates to an improvement in dental tooth regulating or orthodontia appliances of the arch-bar type, my object being to provide a readily detachable connection between the parts of said appliances.

My invention is illustrated in the accompanying drawings, described in the following specification, and pointed out in the claims at the conclusion thereof.

In said drawings Figure I is a plan view of a tooth regulating appliance of the arch-bar type mounted upon a set of teeth. Fig. II is a side view of the same. Fig. III is an enlarged view in side elevation of one form of my improvement; Fig. IV a sectional view thereof; Fig. V a view at a right angle to Figs. III and IV, and Fig. VI is a detached view of the anchor tube and its lug or catch. Figs. VII, VIII and IX are views of another form of my invention. Figs. X, XI and XII are views of still another form. Figs. XIII, XIV and XV are views of a form of my invention in which the connection is disposed at a different angle to those in the other forms.

The type of regulating appliance to which my invention is applicable comprises an anchor member consisting of two anchor bands 1 adapted to be securely attached to anchor teeth, such as the molars 2, and anchor tubes 3 attached to said bands, and an arch-bar 4 adapted to be attached to malposed teeth and having adjustable connection with said bands 1 by way of the tubes 3. At and near its opposite ends the arch-bar 4 is screw-threaded as at 5, 5. By means of adjusting nuts 6, 6 working upon said threaded portions 5 of the arch-bar and bearing upon the ends of the anchor tubes 3, the arch-bar may be projected and placed under tension for forcing the malposed tooth or teeth in the proper direction, this movement being accomplished by turning the adjusting nuts 6.

At the present time in dental tooth regulating appliances of the type just above described, it is customary to rigidly and permanently secure the anchor tube 3 to the anchor band 1 by solder. During the long operation of tooth regulation, extending through a period of many weeks and oftentimes many months, it at times becomes necessary to separate the arch-bar from the anchor (molar) teeth. To accomplish this in appliances as now constructed, it is either necessary to loosen and remove the anchor bands 1 or to untie the ligature fastening between the arch-bar and the malposed tooth or teeth and withdraw said arch-bar from the anchor tubes 3. For the purpose of facilitating the removal of the arch-bar without disturbing the anchor bands, I have provided a readily detachable connection between the anchor tubes 3 and said anchor bands 1.

Since my invention is not limited to any particular form of detachable connection between the anchor tube and anchor band, I have illustrated several different forms of connection which I will now proceed to describe.

The form of connection shown in Figs. III, IV, V and VI consists of a flattened tube or socket 7 upon the outside of the anchor band 1, and a spring lug, spur or catch 8 projecting from the anchor tube 3, adapted to enter said socket and provided with a bent portion or hook 9 adapted to catch under the end of said socket. By simply inserting the spur in the socket and forcing it into place, the catch automatically interlocks with said socket, thus securely locking the anchor tube to the anchor band. To detach the anchor tube the spur is simply pushed to one side until its hook is disengaged from the socket, when the anchor tube may be easily detached without disturbing the anchor band. By flattening the socket and the spur, as indicated in the drawing, a firm, secure attachment is provided between the anchor tube and anchor band. Obviously the anchor tubes may be detached from the anchor bands while the arch-bar is in said tubes. In other words, the arch-bar and tubes may be detached together from said anchor bands.

In the form of latch illustrated in Figs. VII, VIII and IX the flat lug or spur 10 is rigid and is not provided with a hook or catch, but entirely fills the flat socket 7. A separate spring hook or catch 11 projects from the anchor tube, passing outside of the socket 7, its bent end 12 engaging the end of said socket.

The form of connection shown in Figs. X, XI and XII is similar to the form last described, except that the spring catch or hook 13 is differently located and extends in a different direction.

In the three forms above described the lugs or spurs are disposed perpendicularly to the anchor tube and the socket on the anchor band is disposed correspondingly. I also contemplate disposing the lug or spur in the same plane as the anchor tubes, such a construction being indicated in Figs. XIII, XIV and XV.

Without elaborating upon the different kinds of regulating operations which may be accomplished with my improved appliance and the various conditions under which it may be used, it will be sufficient to say that the chief advantage of my improvement is the ease with which the arch-bar and anchor tubes may be separated from the anchor bands without disturbing the same and without disturbing the adjusting nuts.

I claim as my invention:

1. A dental tooth regulating appliance of the arch-bar type comprising an anchor-band, means on said band for securing it upon a tooth, a tube for the reception of an arch-bar, and a detachable, interlocking connection between said tube and anchor-band.

2. A dental tooth regulating appliance of the arch-bar type comprising an anchor-band, means on said band for securing it upon a tooth, a socket on said band, a tube for the reception of an arch-bar, and a latch on said tube having detachable, interlocking engagement with said socket.

In testimony whereof I have fixed my signature in the presence of two witnesses.

FRANK A. GOUGH.

Witnesses:
CLARENCE F. LAMONT,
BERNARD F. HOGAN.